(12) United States Patent
Chau

(10) Patent No.: US 10,892,969 B2
(45) Date of Patent: Jan. 12, 2021

(54) CLUSTER WIDE PACKET TRACING

(71) Applicant: Cisco Technology, Inc., San Jose, CA (US)

(72) Inventor: Hung The Chau, Highland, CA (US)

(73) Assignee: Cisco Technology, Inc., San Jose, CA (US)

(*) Notice: Subject to any disclaimer, the term of this patent is extended or adjusted under 35 U.S.C. 154(b) by 391 days.

(21) Appl. No.: 15/820,545

(22) Filed: Nov. 22, 2017

(65) Prior Publication Data

US 2019/0158377 A1    May 23, 2019

(51) Int. Cl.
```
G06F 15/173   (2006.01)
H04L 12/26    (2006.01)
H04L 12/721   (2013.01)
H04L 12/24    (2006.01)
```

(52) U.S. Cl.
CPC .............. *H04L 43/10* (2013.01); *H04L 43/50* (2013.01); *H04L 45/26* (2013.01); *H04L 41/0677* (2013.01); *H04L 43/0817* (2013.01); *H04L 43/12* (2013.01)

(58) Field of Classification Search
CPC .............................. H04L 43/062; H04L 45/74
USPC .................................................. 709/223, 224
See application file for complete search history.

(56) References Cited

U.S. PATENT DOCUMENTS

| | | | |
|---|---|---|---|
| 7,292,537 B2 | 11/2007 | Charcranoon | |
| 9,237,082 B2 | 1/2016 | Ziegler | |
| 9,344,349 B2 | 5/2016 | Ganichev et al. | |
| 9,369,368 B2 | 6/2016 | Khanal et al. | |
| 9,495,378 B2 | 11/2016 | Sundaram et al. | |
| 2013/0250777 A1* | 9/2013 | Ziegler | H04L 43/10 370/248 |
| 2014/0301213 A1* | 10/2014 | Khanal | H04L 43/04 370/248 |

OTHER PUBLICATIONS

Y. Zhu, et al., "Packet-Level Telemetry in Large Datacenter Networks", SIGCOMM '15, Aug. 17-21, 2015, London, United Kingdom, 13 pages.

* cited by examiner

*Primary Examiner* — Wing F Chan
*Assistant Examiner* — Andrew Woo
(74) *Attorney, Agent, or Firm* — Edell, Shapiro & Finnan, LLC

(57) ABSTRACT

A method and system for packet tracing is described. In one embodiment, a method includes selecting a packet for tracing through a cluster of a plurality of nodes. The method includes preparing the packet for tracing by generating a cluster-wide unique ID, associating the unique ID with the packet, generating a running counter, and associating the counter with the packet. The method includes generating a first record buffer on a first node of the plurality of nodes and recording the unique ID and an initial value of the counter. The method includes recording a description of an operation performed on the packet in the first record buffer along with a value of the counter. The method also includes transferring the packet to a second node, along with the unique ID, the value of the running counter, and an attribute that indicates that the packet is to be traced.

20 Claims, 8 Drawing Sheets

CLUSTER WIDE PACKET TRACING

TECHNICAL FIELD

This disclosure relates generally to tracing a packet in a computer network.

BACKGROUND

Packet tracing is a computer network diagnostic tool for recording the route or path of a packet as it is processed along its path of travel within the network. A packet trace can assist network users and support personnel in troubleshooting connectivity problems within the network by showing the failure point. Packet tracing can provide identification of a configuration error and any internal coding of that error. Packet tracing may also be used to help understand how a packet is processed in a particular computer network environment or architecture.

DESCRIPTION OF EXAMPLE EMBODIMENTS

Overview

Presented herein is a method and a system for tracing packets in a computer network. In an example embodiment, a method includes selecting a packet for tracing, the packet being configured to traverse through a cluster comprising a plurality of nodes. The method of tracing the packet also includes preparing the packet for tracing by generating a cluster-wide unique identifier (ID) for the packet, associating the unique ID with the packet, generating a running counter for the packet, and associating the running counter with the packet. The running counter has an initial value. The method further includes generating a first record buffer that is stored on a first node of the plurality of nodes. At least the unique ID and the initial value of the running counter for the packet are recorded in the first record buffer stored on the first node. A description of an operation performed on the packet is also recorded in the first record buffer along with a value of the running counter. The value of the running counter is incremented by one after the operation is recorded. The method further includes transferring the packet to a second node of the plurality of nodes. The unique ID of the packet, the value of the running counter of the packet, and an attribute that indicates that the packet is to be traced is also provided to the second node.

EXAMPLE EMBODIMENTS

Figure 1:
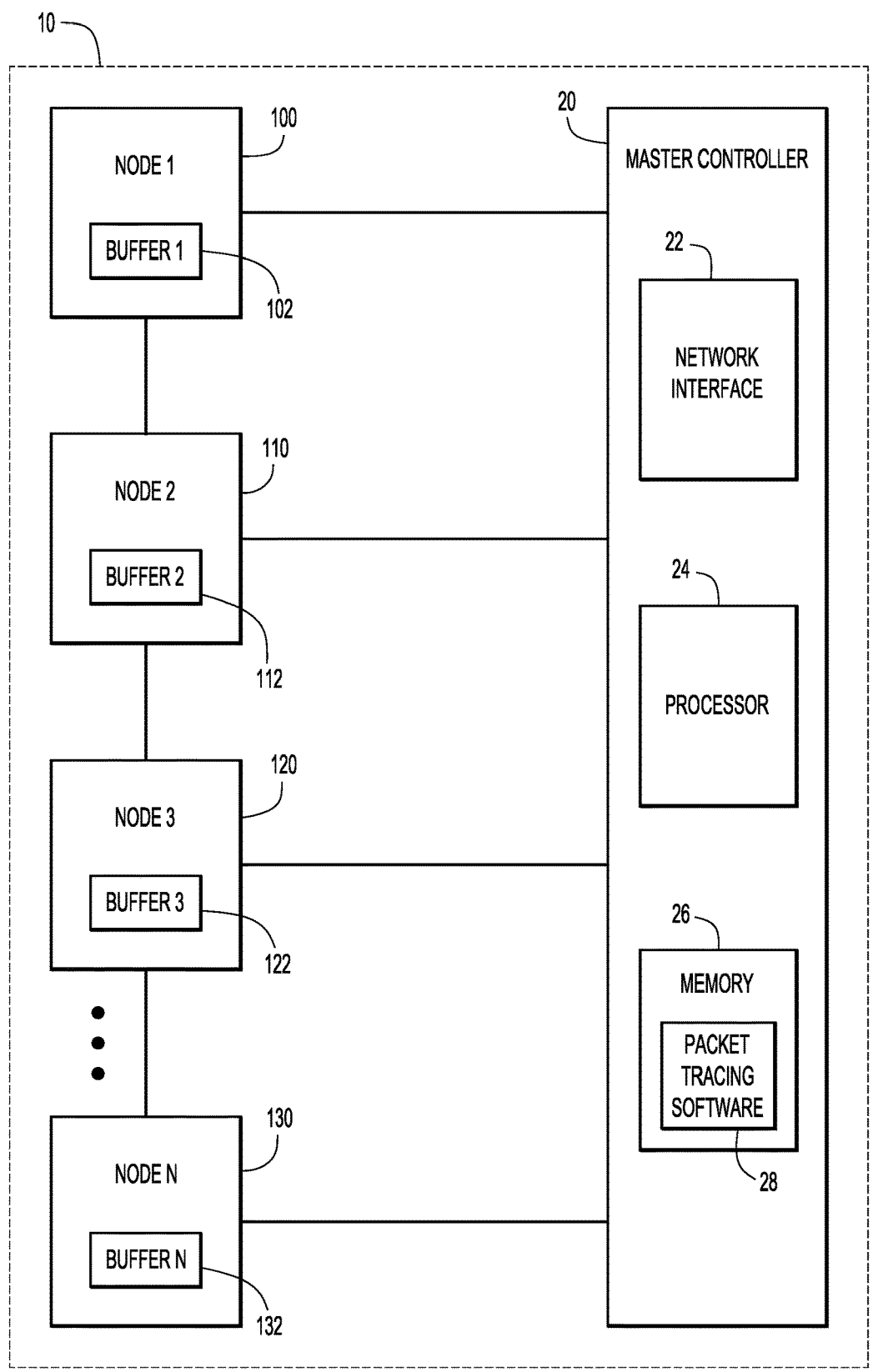
FIG. 1 is a block diagram illustrating a cluster of network nodes in which packet tracing may be implemented, according to an example embodiment.

FIG. 1 is a block diagram illustrating a cluster 10 in which packet tracing may be implemented, according to an example embodiment. Cluster 10 may be a computer network, or a part of a network, and includes a plurality of nodes, including a first node 100, a second node 110, a third node 120, and an nth node 130 (where n may be any number of additional nodes), that are monitored and controlled by a master controller 20. In one example embodiment, plurality of nodes 100, 110, 120, 130 of cluster 10 may be network elements of any of a variety of types, such as switches, routers, gateways, as well as networking appliances, such as firewalls, intrusion detection systems, etc. The network elements may be physical, virtual (e.g., implemented in software), or a combination of both.

In an example embodiment, each node of plurality of nodes 100, 110, 120, 130 includes a record buffer. For example, first node 100 includes a first record buffer 102, second node 110 includes a second record buffer 112, third node 120 includes a third record buffer 122, and nth node 130 includes an nth record buffer 132 (i.e., each additional nth node is associated with a corresponding nth additional record buffer). Each record buffer may be one or more storage media that allows a node to record and save information locally for that node. With this configuration, each node of plurality of nodes 100, 110, 120, 130 includes a corresponding record buffer 102, 112, 122, 132. As will be further described below, providing each node with a record buffer allows packet trace information to be distributed across the different nodes of cluster 10.

In this embodiment, master controller 20 may include a network interface 22, a processor 24 for processing information, a plurality of network ports (not shown) to connect to plurality of nodes 100, 110, 120, 130, and may further include a bus (not shown) or other communication mechanism coupled with processor 24 for communicating the information. The network interface 22 may be, for example, one or more network interface cards configured to enable network communications. While the figure shows a single block 24 for a processor, it should be understood that the processor 24 may represent a plurality of processing cores, each of which can perform separate processing.

Master controller 20 may also include a memory 26. The memory 26 may be read only memory (ROM), random access memory (RAM), magnetic disk storage media devices, optical storage media devices, flash memory devices, electrical, optical, or other physical/tangible memory storage devices. Thus, in general, the memory 26 may comprise one or more tangible (non-transitory) computer readable storage media (e.g., a memory device) encoded with software comprising computer executable instructions and when the software is executed (by the processor 24) it is operable to perform the operations described herein. For example, packet tracing software 28 is stored in memory 26 for providing one or more of the packet tracing operations described herein. In particular, packet tracing software 28 may cause master controller 20 to perform the operations described in connection with FIGS. 4, 7, and 8 below when executed by processor 24 from memory 26. In addition, memory 26 may be used for storing temporary variables or other intermediate information during the execution of instructions by processor 24.

Figure 2:
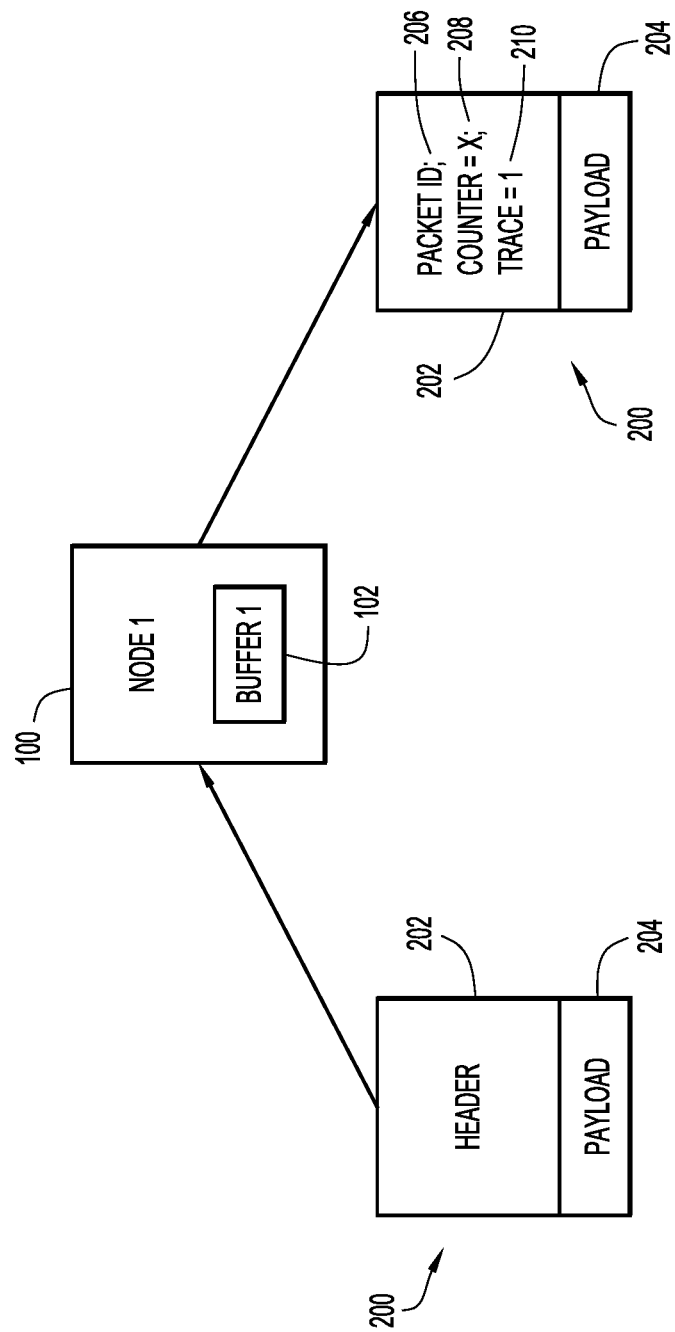
FIG. 2 is a diagram illustrating a node implementing packet tracing of a packet, according to an example embodiment.

Referring now to FIG. 2, a diagram illustrating a node implementing packet tracing of a packet is shown, according to an example embodiment. In this embodiment, a packet 200 is received by a node in cluster 10, in this case, first node 100. As shown in FIG. 2, packet 200 includes at least a header 202 and a payload 204. Header 202 may be an Internet Protocol (IP) header and may include information identifying at least a source and destination. Payload 204 may be any type of data carried by packet 200. It should be understood, however, that packet 200 may include additional portions, such as a trailer, and that the whole packet 200 may be forwarded from node to node through cluster 10. In this embodiment, a packet trace for packet 200 may start or originate at first node 100 and continue as packet 200 traverses through cluster 10. In other words, first node 100 is an originating node for packet 200. It should be understood that in this example, packet 200 is an IP packet, but the principles of the example embodiments described herein can apply to any type of packets using different protocols.

According to the principles of the embodiments described herein, once the originating node (e.g., first node 100) selects packet 200 for tracing, that node will then prepare packet 200 for tracing. In this embodiment, packet 200 has been selected for tracing by first node 100. First node 100 prepares packet 200 for tracing by generating a cluster-wide unique identifier (ID) 206 for packet 200 and associating the unique ID 206 with packet 200, for example, by including the unique ID 206 in header 202 of packet 200. Unique ID 206 is configured so that packet 200 may be individually identified throughout cluster 10. For example, unique ID 206 may include at least a first portion that identifies the originating node that begins or originates the packet trace (e.g., first node 100) and a second portion that is a unique number for each packet that is specific to only that particular node (e.g., packet 200). With this arrangement, packets that have traces started at different nodes will have at least different first portions of their unique IDs and packets that have traces started at the same node will have at least different second portions of their unique IDs.

First node 100 further prepares packet 200 for tracing by generating a running counter 208 for packet 200, and associating the running counter 208 with packet 200, for example, by including the running counter 208 in header 202 of packet 200. The running counter 208 has an initial value that may be set when the running counter 208 is first generated and is included in header 202. Each operation performed on packet 200 will increment running counter 208 by one (1). First node 100 records the unique ID 206 and value of running counter 208 in first record buffer 102. If first record buffer 102 is not already stored on first node 100, then first node 100 generates and stores first record buffer 102 on first node 100.

Additionally, the originating node (e.g., first node 100) generates or includes information with packet 200 so that other nodes in cluster 10 that receive packet 200 will continue packet tracing. In this embodiment, header 202 of packet 200 also includes an attribute 210 that indicates that packet 200 is to be traced as it traverses cluster 10, for example, by setting a flag that indicates tracing is to be performed (e.g., "Trace=1"). In other embodiments, however, this attribute is optional and packet tracing may be implicitly assumed to be true by a node if a packet is received that includes a packet ID (e.g., unique ID 206 implicitly identifies that packet 200 should be traced by the receiving node).

Figure 3:
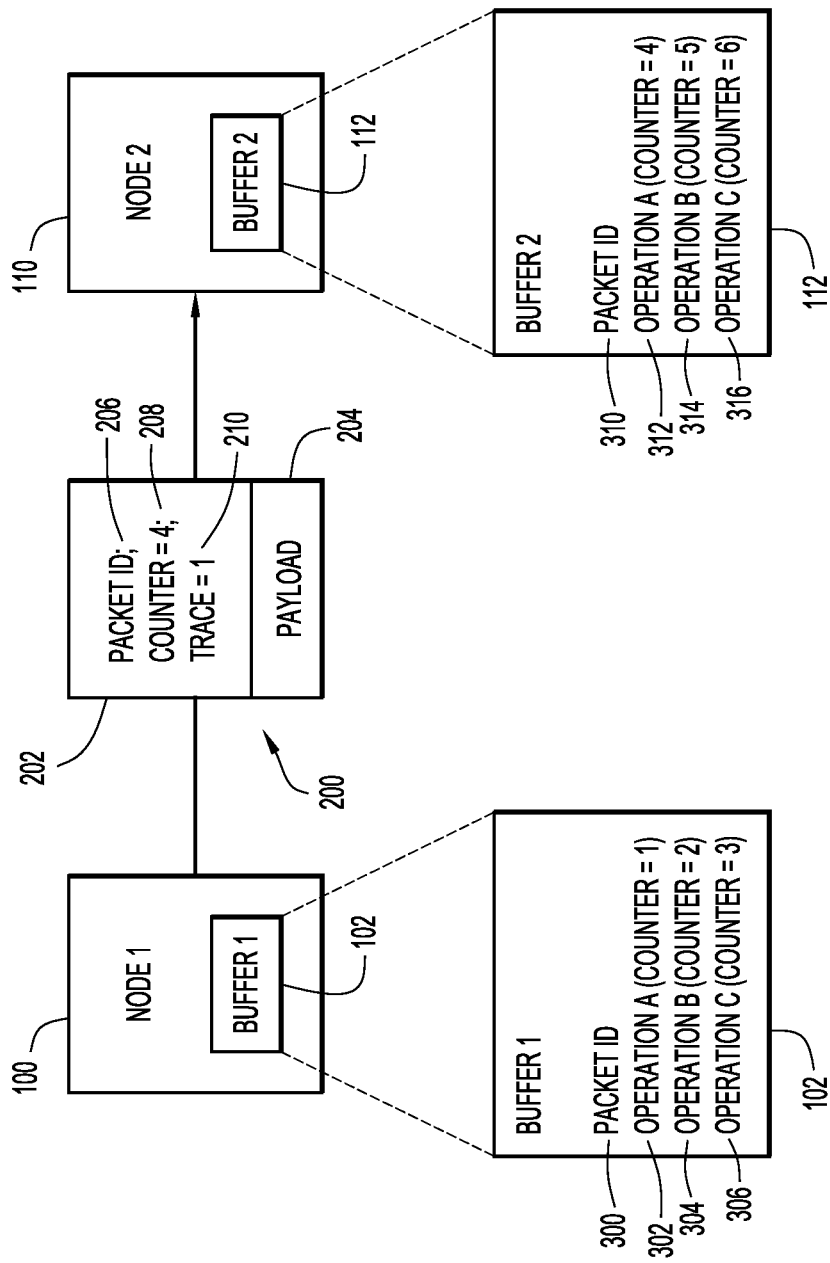
FIG. 3 is a diagram illustrating a packet traversing from a sending node to a receiving node within a cluster, according to an example embodiment.

FIG. 3 is a diagram illustrating packet 200 traversing through cluster 10 from a sending node to a receiving node, according to an example embodiment. In this embodiment, packet 200 is being sent from first node 100 (i.e., the sending node) to second node 110 (i.e., the receiving node). First node 100 includes first record buffer 102 that stores information associated with processing of packet 200 on first node 100. First record buffer 102 remains with first node 100 as packet 200 traverses from first node 100 to second node 110. In this embodiment, first record buffer 102 may include a packet identifier (ID) 300 of packet 200 (e.g., unique ID 206) and a plurality of entries for each of the operations performed on packet 200, along with associated counter values from running counter 208 for each operation.

For example, the operations performed on packet 200 on first node 100 may include a first operation 302 (Operation A associated with a counter value=1), a second operation 304 (Operation B associated with a counter value=2), and a third operation 306 (Operation C associated with a counter value=3). In this example, each operation may be a different type of operation (e.g., Operation A, Operation B, and Operation C) performed on packet 200. It should be understood, however, that the operations may be any type or kind of operation performed on packet 200 that can be recorded in first record buffer 102, including similar or different types of operations. For example, some operations that can be performed on packets, such as packet 200, include, but are not limited to: access-control, route-lookup, network address translation, packet inspection for application protocol, packet encryption, packet decryption, packet capture, and/or cluster internode forwarding.

As noted above, running counter 208 of packet 200 is incremented by one after each operation. As shown in first record buffer 102, the order of operations performed on packet 200 on first node 100 can be determined by the counter value associated with each operation. In this example, the sequence of operations performed on packet 200 is first operation 302 (Operation A associated with a counter value=1), second operation 304 (Operation B associated with a counter value=2), and, then, third operation 306 (Operation C associated with a counter value=3).

In this embodiment, first node 100 (i.e., the sending node) transfers packet 200 to second node 110 (i.e., the receiving node). Along with packet 200, first node 100 also provides the unique ID 206 of packet 200, running counter 208, and the attribute 210 that indicates that packet 200 should be traced to second node 110. For example, header 202 of packet 200 may include unique ID 206, running counter 208, and attribute 210. Upon receiving packet 200, second node 110 is alerted that packet 200 should be traced by the presence of attribute 210. Second node 110 records the unique ID 206 and value of running counter 208 (e.g., counter=4) in second record buffer 112. If second record buffer 112 is not already stored on second node 110, then second node 110 generates and stores second record buffer 112 on second node 110.

Once packet 200 is received by second node 110, information associated with the processing of packet 200 on second node 110 may be stored in second record buffer 112. In this embodiment, second record buffer 112 may include a packet identifier (ID) 310 of packet 200 (e.g., unique ID 206) and a plurality of entries for each of the operations performed on packet 200, along with associated counter values from running counter 208 for each operation. For example, the operations performed on packet 200 on second node 110 may include a first operation 312 (Operation A associated with a counter value=4), a second operation 314

(Operation B associated with a counter value=5), and a third operation 316 (Operation C associated with a counter value=6). As with the previous example, each operation may be a different type of operation (e.g., Operation A, Operation B, and Operation C), however, the operations may be any type or kind of operation performed on packet 200 that can be recorded in second record buffer 112, including similar or different types of operations.

In this example, second node 110 records descriptions of operations in second record buffer 112 using the value of the running counter 208 provided with packet 200 by first node 100. That is, second node 110 will begin recording descriptions of operations in second record buffer 112 using the next incremental value of running counter 208 from the last operation entry from first record buffer 102 of first node 100. Thus, third operation 306 recorded in first record buffer 102 is associated with a counter value of 3 and first operation 312 recorded in second record buffer 112 is associated with a counter value of 4.

The process of transferring packet 200 from a sending node (e.g., first node 100) to a receiving node (e.g., second node 110) has been described with reference to FIG. 3 for one representative transfer of packet 200 between nodes. However, a similar process may occur for each additional node traversed by packet 200 within cluster 10. For example, packet 200 may traverse additional nodes of cluster 10, including third node 120 and/or up to nth node 130, where n may be any number of additional nodes. With this arrangement, a plurality of record buffers 102, 112, 122, 132 may store information associated with processing performed on packet 200 as it traverses through plurality of nodes 100, 110, 120, 130 of cluster 10.

Figure 4:
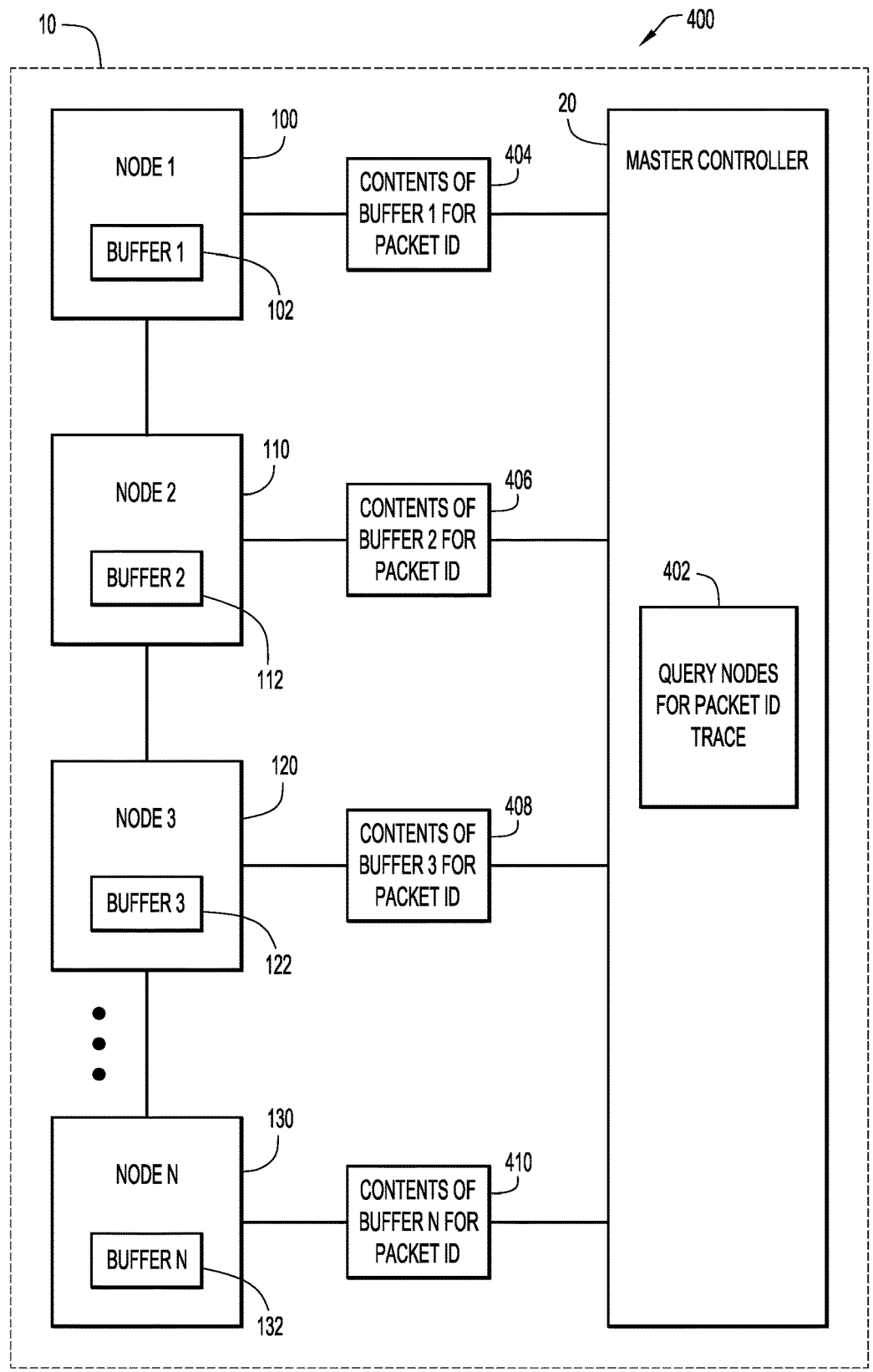
FIG. 4 is a functional diagram of a master controller of a cluster querying nodes for packet tracing information about a packet, according to an example embodiment.

Referring now to FIG. 4, a functional view of a cluster-wide packet trace 400 implemented by master controller 20 of cluster 10 to query nodes for packet tracing information about a packet is shown, according to an example embodiment. In this embodiment, cluster-wide packet trace 400 for packet 200 may be generated by master controller 20. The cluster-wide packet trace 400 aggregates all of the information associated with processing of packet 200 that is stored on each of the nodes of plurality of nodes 100, 110, 120, 130 of cluster 10. For example, master controller 20 may include software intelligence, such as processor 24 and/or packet tracing software 28, described above, that functions to generate a query 402 to each node of plurality of nodes 100, 110, 120, 130 for information associated with packet 200. Query 402 may include a request to each node to provide the contents of its associated record buffer for entries associated with the unique ID 206 of packet 200.

As shown in FIG. 4, each node of plurality of nodes 100, 110, 120, 130 may respond to query 402 by master controller 20 by sending the contents of its respective record buffer for the requested unique ID 206 of packet 200. For example, first node 100 may send contents 404 related to unique ID 206 stored in first record buffer 102, second node 110 may send contents 406 related to unique ID 206 stored in second record buffer 112, third node 120 may send contents 408 related to unique ID 206 stored in third record buffer 122, and nth node 130 may send contents 410 related to unique ID 206 stored in nth record buffer 132. In an example embodiment, each node may include a control operation interface or other suitable software intelligence that allows the node to respond to query 402 or other requests for information from master controller 20.

In this example, each node responds with contents 404, 406, 408, 410 of its respective record buffer 102, 112, 122, 132 for entries that are associated unique ID 206 of packet 200. In other embodiments, however, a node may respond with a null response or other message to master controller 20 if the node does not have any information associated with the requested unique ID of a packet to be traced in its record buffer. For example, a packet may not traverse every node within a cluster. In such a case, some nodes will not have any information to send in response to a query for a cluster-wide packet trace. In still other embodiments, a node that does not have any information associated with the requested unique ID of a packet to be traced in its record buffer may ignore the request or fail to send any response to the query.

Figure 5:
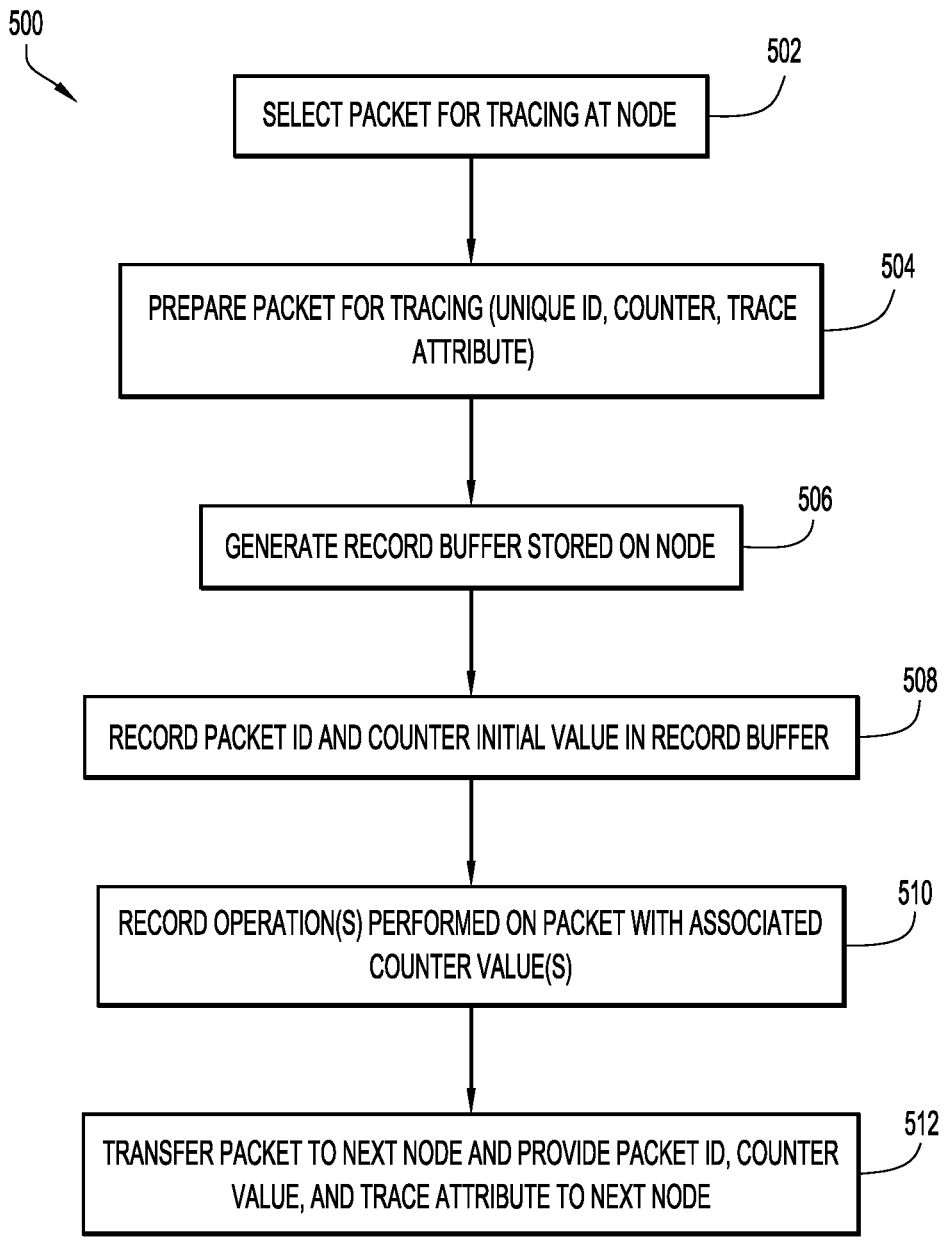
FIG. 5 is a flowchart of a method for implementing packet tracing in an originating node, according to an example embodiment.

The method of packet tracing as a packet traverses nodes in a cluster will be further explained with reference to FIGS. 5 and 6. Referring now to FIG. 5, a flowchart of a method 500 for implementing packet tracing in an originating node, according to an example embodiment, is shown. In this embodiment, method 500 may start with a step 502 of selecting a packet for tracing at the originating node. For example, step 502 may be implemented by an access list match, i.e., the packet matches a condition established in a statement in an access control list associated with the originating node. In other embodiments, step 502 also may be implemented by issuing a command from software running on the master controller 20 or from a control operation interface associated with the originating node to trace a packet matching a specified condition.

Next, the selected packet is prepared for tracing at a step 504. Step 504 includes generating a cluster-wide unique ID for the selected packet and associating the unique ID with the packet (e.g., unique ID 206 of packet 200). As described above, the cluster-wide unique ID for the packet may include at least a first portion that is based on the identity of the originating node (e.g., using an identifier for the originating node) and a second portion that is a unique number for each packet on that node. Step 504 further includes generating a running counter and associating the running counter with the selected packet (e.g., running counter 208). As described above, the running counter may have an initial value that is set when the running counter is first generated. For example, the initial value of the running counter may be equal to 0. The running counter is incremented upon recording each operation performed on the packet, as described with reference to step 510 below.

Additionally, step 504 may further include generating an attribute that indicates that the selected packet is to be traced as it traverses from node to node through the cluster. For example, the attribute may be a flag or other indicator in a header of the packet that indicates tracing is to be performed (e.g., attribute 210 "Trace=1").

Next, at a step 506, a record buffer is generated and stored on the originating node. In some cases, a suitable record buffer may already exist on the originating node, in which case, step 506 may be omitted. For example, if a suitable record buffer already exists at this node, the packet tracing is a continuation of an existing trace. In other words, the packet trace could have begun at the originating node, traversed to another node, and then returned to the originating node. As described above, the record buffer may be any suitable storage media available to the originating node for storing information. The record buffer is stored locally on the node.

At a step 508, the packet ID for the packet is associated with the record buffer and the initial value for the running counter are stored in the record buffer. Each record buffer is uniquely associated with a corresponding packet through the packet ID (e.g., unique ID 206). Thus, multiple packet traces on a node will each be uniquely associated with a corresponding record buffer for each packet trace on that node.

At a step 510, descriptions of one or more operations performed on the packet are recorded in the record buffer along with an associated counter value of the running counter for each operation. After the description of an operation is recorded in the record buffer at step 510, the running counter is incremented, for example, by one increment, for that operation. The value of the running counter, therefore, increases linearly with each additional operation performed on the packet. Method 500 may repeat step 510 multiple times as necessary for multiple operations performed on packet while the packet is on the node. For example, as shown in FIG. 3 above, packet 200 had three different operations performed on it while on first node 100, resulting in three entry descriptions with associated counter values stored in first record buffer 102.

Finally, at a step 512, once the originating node has finished processing operations on the packet, the node may transfer the packet to the next node. Along with providing the packet to the next node, the originating node also provides the unique ID of the packet, the current value of the running counter, and the attribute to indicate that packet is to be traced at step 512. For example, as shown in FIG. 3 above, first node 100 may provide packet 200 along with unique ID 206, running counter 208, and attribute 210 to second node 110. Upon completion of step 512, method 500 may end, or may repeat from the beginning for the next packet to be traced.

Figure 6:
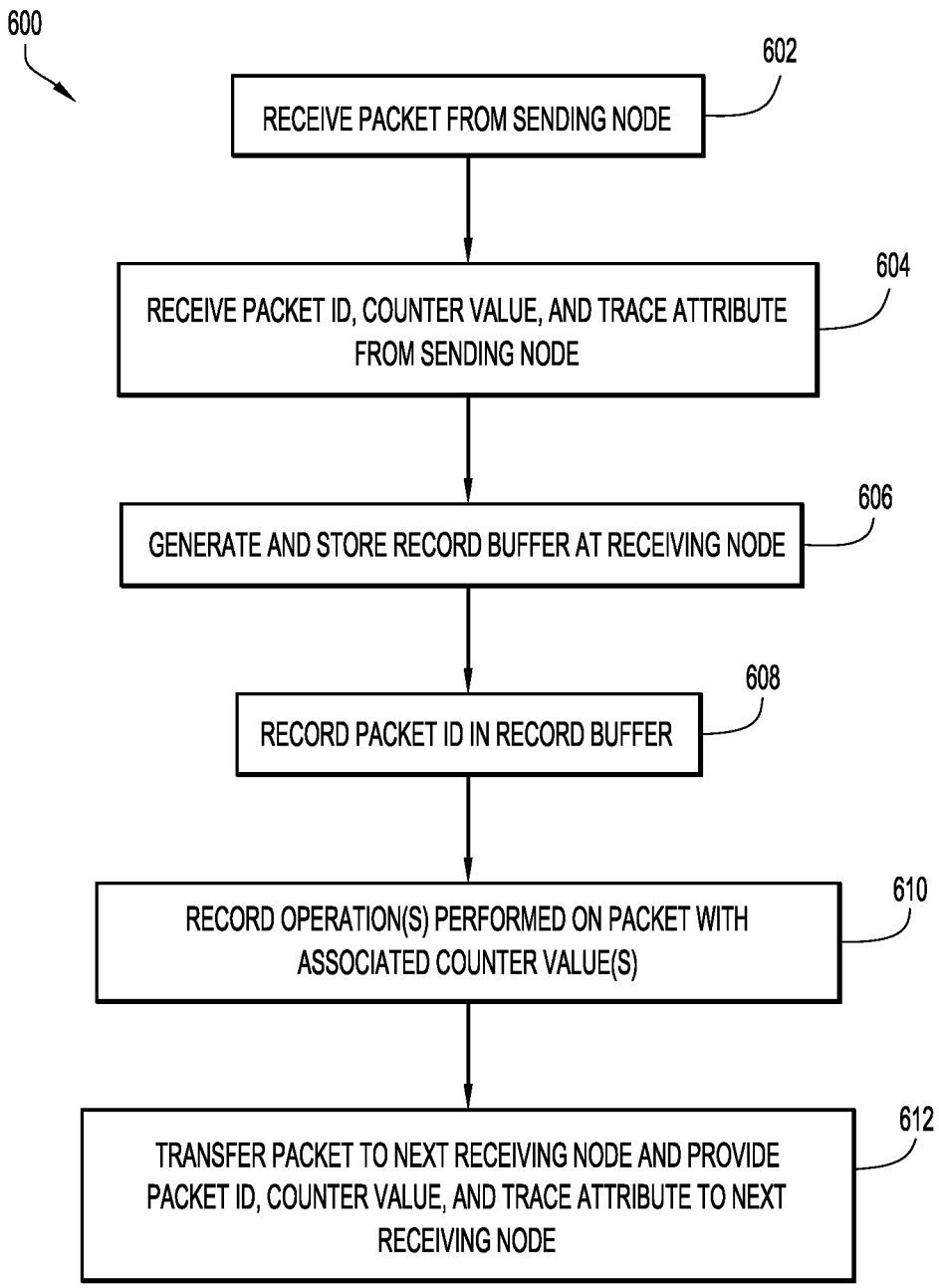
FIG. 6 is a flowchart of a method for implementing packet tracing in a receiving node, according to an example embodiment.

Referring now to FIG. 6, a flowchart of a method 600 for implementing packet tracing in a receiving node, according to an example embodiment, is shown. In this embodiment, method 600 may start with a step 602 of receiving a packet from a sending node. For example, at step 602 the receiving node may receive the packet from the originating node, as described with reference to the method of FIG. 5 above, or from another node in the cluster. Next, at a step 604, the receiving node also receives the unique ID of the packet, the current value of the running counter, and the attribute to indicate that packet is to be traced from the sending node. For example, the information received at step 604 may include unique ID 206 of packet 200, the current value of running counter 208, and attribute 210, as shown in FIG. 3 above. The presence of the attribute marking the packet informs the receiving node that the packet associated with the received unique ID is to be traced. With this arrangement, packet tracing may continue as a packet traverses from one node in a cluster to another node in the cluster.

Next, at a step 606, a record buffer is generated and stored on the receiving node. In some cases, a suitable record buffer may already exist on the receiving node, in which case, step 606 may be omitted. As described above, the record buffer may be any suitable storage media available to the receiving node for storing information. The record buffer is stored locally on each receiving node.

At a step 608, the packet ID for the packet is stored in the record buffer. In this case, the packet ID is the unique ID generated for the packet at the originating node, as described with reference to FIG. 5 above. That is, the same unique ID for the packet is stored in the record buffer on each receiving node. With this arrangement, the receiving node may begin storing information associated with operations performed on the packet to be traced. At a step 610, descriptions of one or more operations performed on the packet are recorded in the record buffer along with an associated counter value of the running counter for each operation. In this example, the value of the running counter for the packet will continue from the previous value of the running counter that is provided to the receiving node at step 604 above. After the description of an operation is recorded in the record buffer at step 610, the running counter is incremented, as previously described.

For example, as shown in FIG. 3 above, packet 200 had three different operations performed on it while on second node 110, resulting in three entry descriptions with associated counter values stored in second record buffer 112. Additionally, the first operation 312 in second record buffer 112 is associated with a counter value=4 that continues from the previous value of the running counter for the last operation in first record buffer 102 (i.e., third operation 306) with a counter value=3. With this arrangement, the sequence of operations performed on packet 200 may be maintained as it traverses through multiple nodes within cluster 10.

Finally, at a step 612, once the receiving node has finished processing operations on the packet, the node may transfer the packet to the next node. Along with providing the packet to the next node, the receiving node also provides the unique ID of the packet, the current value of the running counter, and the attribute to indicate that packet is to be traced at step 612. Thus, the receiving node becomes a sending node that transfers the packet to the next receiving node, which will perform method 600 as described above. Method 600 may repeat for each node traversed by the packet to be traced until the packet leaves the cluster or packet tracing is otherwise terminated.

Figure 7:
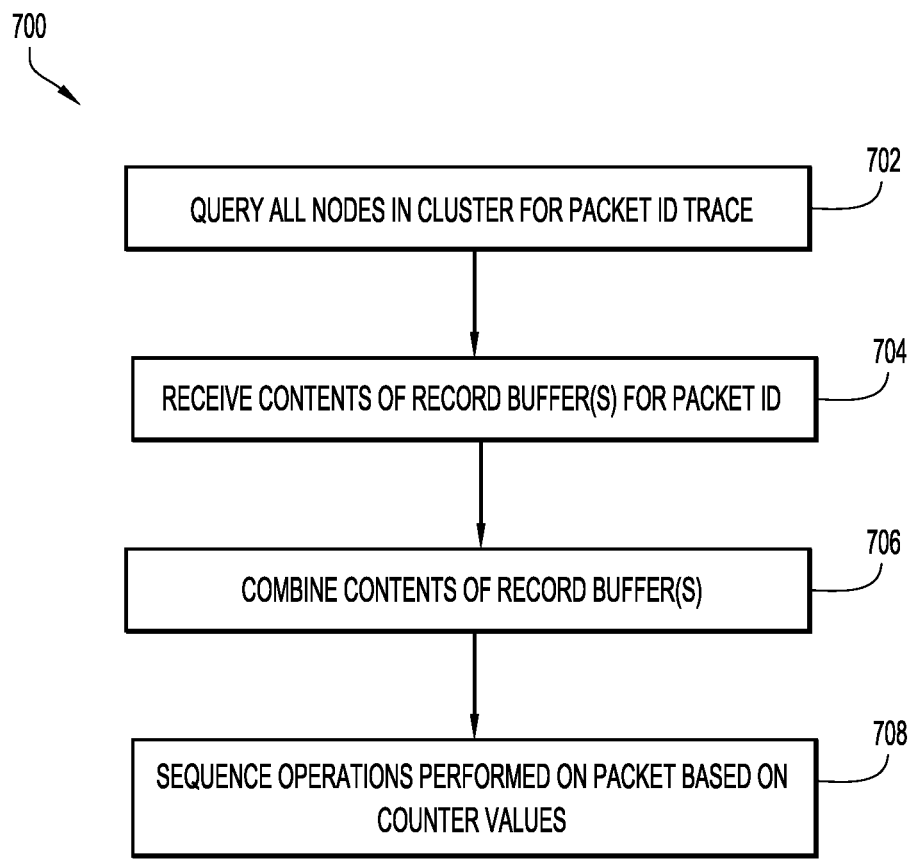
FIG. 7 is a flowchart of a method for aggregating records for a cluster-wide packet trace, according to an example embodiment. [mil)].

Once a packet has finished traversing multiple nodes of a cluster, for example, plurality of nodes 100, 110, 120, 130 of cluster 10 shown in FIG. 1, a cluster-wide packet trace may be generated that aggregates all of the entries in the record buffers of each node traversed by the packet. FIG. 7 is a flowchart of a method 700 for aggregating records for a cluster-wide packet trace, according to an example embodiment. In an example embodiment, the steps of method 700 may be implemented by software intelligence associated with master controller 20, such as processor 24 and/or packet tracing software 28, described above.

In this embodiment, method 700 may start at a step 702 where all nodes in a cluster are queried for information stored in their respective record buffers for a packet to be traced. For example, the query may include the unique ID of the packet (e.g., unique ID 206 of packet 200).

Next, at a step 704, the contents of all relevant record buffers that contain information associated with the packet to be traced are received from the nodes of the plurality of nodes of the cluster. For example, as shown in FIG. 4 above, plurality of nodes 100, 110, 120, 130 may provide contents 404, 406, 408, 410 of respective record buffers 102, 112, 122, 132 that are associated unique ID 206 of packet 200 at step 702.

At a step 706, the received contents of the record buffers received at step 704 may be combined to aggregate all of the information associated with the packet to be traced across the entire cluster. Finally, at a step 708, the aggregated information of operations associated with the packet to be traced may be sequenced, or put into an ordered arrangement, based on the associated counter values of the operations contained in the contents of the record buffers from the nodes in the cluster, as will be further described with reference to FIG. 8 below. With this arrangement, a cluster-wide packet trace may be generated.

Figure 8:
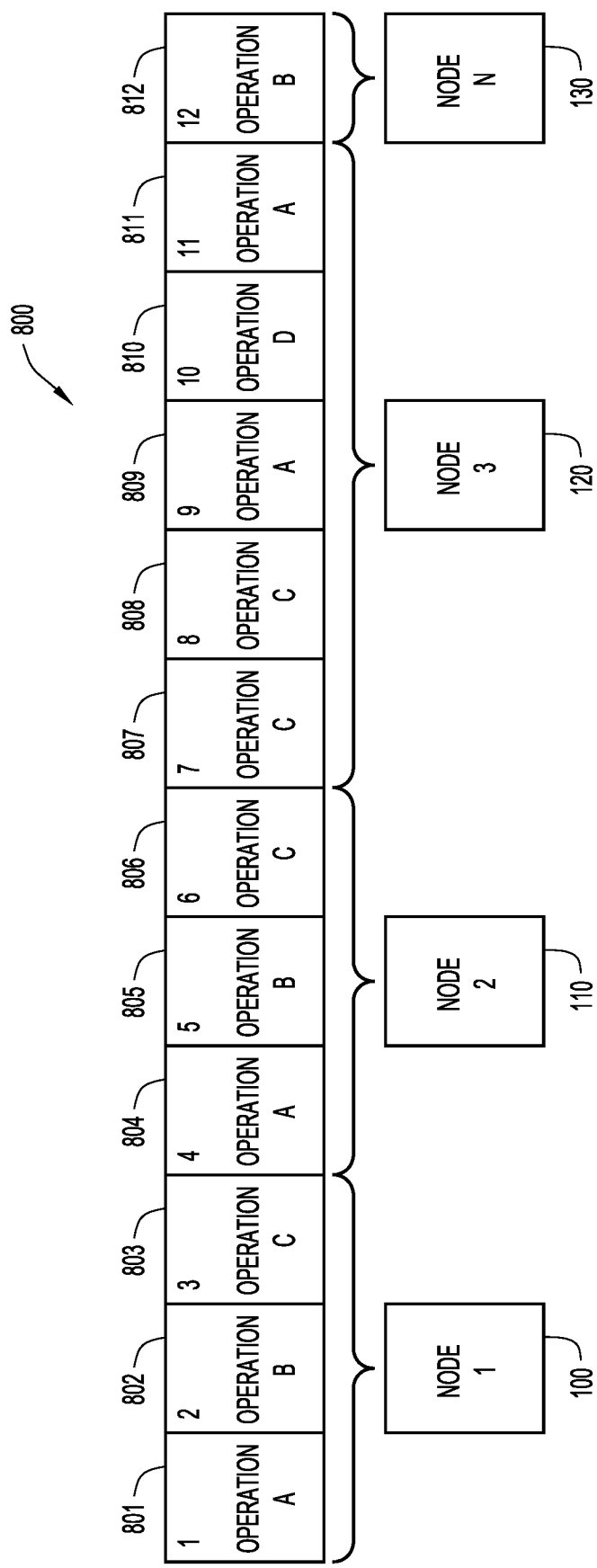
FIG. 8 is a representative view of a cluster-wide packet trace, according to an example embodiment.

FIG. 8 is a representative view of a cluster-wide packet trace 800, according to an example embodiment. In this example, cluster-wide packet trace 800 includes a plurality of operations performed on a packet by multiple nodes of a cluster. For example, packet trace 800 may include operations performed on packet 200 as it traverses a plurality of nodes of cluster 10, including first node 100, second node 110, third node 120, and nth node 130. At each node, one or more operations have been performed on the packet. In this example, various operations may include Operation A, Operation B, Operation C, and Operation D. These operations can represent different kinds or types of processing performed on the packet as it traverses through the cluster.

In this embodiment, cluster-wide packet trace 800 may be generated by querying all of the nodes (e.g., nodes 100, 110, 120, 130) for the contents of their respective record buffers associated with the packet to be traced, as described above with reference to FIG. 7. The information received in response to the query may then be combined in sequence of the order of operations performed on the packet to generate cluster-wide packet trace 800 by using the associated value of the running counter for each operation. In this embodiment, cluster-wide packet trace 800 includes a first operation 801 (Operation A) with associated counter value=1, a second operation 802 (Operation B) with associated counter value=2, a third operation 803 (Operation C) with associated counter value=3, a fourth operation 804 (Operation A) with associated counter value=4, a fifth operation 805 (Operation B) with associated counter value=5, a sixth operation 806 (Operation C) with associated counter value=6, a seventh operation 807 (Operation C) with associated counter value=7, an eighth operation 808 (Operation C) with associated counter value=8, a ninth operation 809 (Operation A) with associated counter value=9, a tenth operation 810 (Operation D) with associated counter value=10, an eleventh operation 811 (Operation A) with associated counter value=11, and a twelfth operation 812 (Operation B) with associated counter value=12.

In this embodiment, cluster-wide packet trace 800 uses the values of the running counter associated with each operation to sequence the operations performed on the packet in the order that they occurred. For example, operations 801, 802, 803 performed on the packet on first node 100, operations 804, 805, 806 performed on the packet on second node 110, operations 807, 808, 809, 810, 811 performed on the packet on third node 120, and operation 812 performed on the packet on nth node 130 may be placed in the order they occurred by using the value of the running counter. By maintaining separate record buffers on each node that store the unique ID of the packet along with the value of the running counter for each operation, cluster-wide packet trace 800 may be generated by aggregating the separate record buffer contents and sequencing the operations using the counter values.

The principles of the example embodiments described herein can provide a serviceability capability to trace processing of a packet as it traverses a cluster. This information can help support personnel and customers troubleshoot connectivity problems by showing the failure point. This can also provide quick identification of configuration errors and internal coding for that error. Cluster-wide packet tracing may also be used for education by helping to understand how packet processing works in a cluster environment.

The example embodiments provide a cluster-wide unique ID for a packet and a running counter to enable a distributed version of packet tracing. This allows the packet trace information to be stored on each local node. Using the cluster-wide unique ID, all of the processing on the packet by all nodes in the cluster can be gathered. Further, using the running counter, the processing on the packet can be sequenced.

The principles of the example embodiments described herein function with minimal expansion of the packet size and within jumbo frame packet-size limitations. Moreover, the principles of the example embodiments do not require packet segmentation or fragmentation to trace a packet.

Additionally, the principles of the example embodiments described herein provide a cluster-wide unique ID that is generated by the originating node so that each packet to be traced is uniquely identified throughout the cluster. Thus, packets that share the same source/destination addresses may still be uniquely identified for tracing throughout the cluster.

In summary, a method of tracing a packet in a cluster is provided comprising: selecting a packet for tracing, the packet being configured to traverse through a cluster comprising a plurality of nodes; preparing the packet for tracing by: (i) generating a cluster-wide unique identifier (ID) for the packet, (ii) associating the unique ID with the packet, (iii) generating a running counter for the packet, and (iv) associating the running counter with the packet, wherein the running counter has an initial value; generating a first record buffer that is stored on a first node of the plurality of nodes; recording at least the unique ID and the initial value of the running counter for the packet in the first record buffer stored on the first node; recording a description of an operation performed on the packet in the first record buffer along with a value of the running counter, wherein the value of the running counter is incremented by one after the operation is recorded; and transferring the packet to a second node of the plurality of nodes, wherein the unique ID of the packet, the value of the running counter of the packet, and an attribute that indicates that the packet is to be traced is provided to the second node.

In addition, a non-transitory computer readable storage media encoded with instructions that, when executed by a processor, cause the processor to perform operations is provided comprising: selecting a packet for tracing, the packet being configured to traverse through a cluster comprising a plurality of nodes; preparing the packet for tracing by: (i) generating a cluster-wide unique identifier (ID) for the packet, (ii) associating the unique ID with the packet, (iii) generating a running counter for the packet, and (iv) associating the running counter with the packet, wherein the running counter has an initial value; generating a first record buffer that is stored on a first node of the plurality of nodes; recording at least the unique ID and the initial value of the running counter for the packet in the first record buffer stored on the first node; recording a description of an operation performed on the packet in the first record buffer along with a value of the running counter, wherein the value of the running counter is incremented by one after the operation is recorded; and transferring the packet to a second node of the plurality of nodes, wherein the unique ID of the packet, the value of the running counter of the packet, and an attribute that indicates that the packet is to be traced is provided to the second node.

Furthermore, an apparatus is provided comprising: a network interface configured to enable network communications with a plurality of nodes in a cluster; a memory; and a processor coupled with the memory and the network interface, and configured to: query the plurality of nodes for information associated with a packet, wherein the packet is identified by a cluster-wide unique identifier (ID) generated by an originating node of the plurality of nodes; receive contents of record buffers from the plurality of nodes, wherein the contents of the record buffers includes at least the unique ID of the packet and one or more descriptions of operations performed on the packet, wherein each description of an operation performed on the packet has an associated counter value from a running counter associated with the packet; combine the contents of the record buffers from the plurality of nodes; and generate a cluster-wide packet trace for the packet using the contents of the record buffers from the plurality of nodes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   selecting a packet for tracing, the packet being configured to traverse through a cluster comprising a plurality of nodes;
   preparing the packet for tracing by: generating a cluster-wide unique identifier (ID) for the packet, associating the cluster-wide unique ID with the packet, generating a running counter for the packet, and associating the running counter with the packet, wherein the running counter has an initial value;
   generating a first record buffer that is stored on a first node of the plurality of nodes;
   recording at least the cluster-wide unique ID and the initial value of the running counter for the packet in the first record buffer stored on the first node;
   recording descriptions of a plurality of operations performed on the packet in the first record buffer along with a current value of the running counter, wherein the current value of the running counter is incremented by one after each one of the descriptions of the plurality of operations performed is recorded; and
   transferring the packet to a second node of the plurality of nodes, wherein the cluster-wide unique ID of the packet, the current value of the running counter of the packet, and an attribute that indicates that the packet is to be traced is provided to the second node.

2. The method of claim 1, further comprising:
   receiving the packet at the second node of the plurality of nodes;
   generating a second record buffer that is stored on the second node; and
   recording at least the cluster-wide unique ID and the current value of the running counter for the packet in the second record buffer stored on the second node.

3. The method of claim 2, further comprising:
   recording a description of an operation performed on the packet in the second record buffer along with the current value of the running counter; and
   transferring the packet to a third node of the plurality of nodes, wherein the cluster-wide unique ID of the packet, the current value of the running counter of the packet, and an attribute that indicates that the packet is to be traced is provided to the third node.

4. The method of claim 1, wherein the cluster-wide unique ID for the packet is generated based on an originating node of the plurality of nodes that selects the packet for tracing.

5. The method of claim 4, wherein the originating node is the first node.

6. The method of claim 1, wherein the packet traverses at least the first node and the second node, and the method further comprises generating a cluster-wide trace for the packet by:
   querying the first node to provide contents associated with the cluster-wide unique ID of the packet from the first record buffer; and
   querying the second node to provide contents associated with the cluster-wide unique ID of the packet from a second record buffer that is stored on the second node.

7. The method of claim 6, wherein generating the cluster-wide trace for the packet further comprises sequencing operations performed on the packet using the current value of the running counter for each of the operations performed that is stored in the first record buffer and the second record buffer.

8. The method of claim 1, wherein the packet further traverses additional nodes of the plurality of nodes of the cluster;
   wherein the additional nodes include at least one sending node and at least one receiving node, wherein the at least one sending node transmits the packet to the at least one receiving node; and
   wherein the sending node further provides the cluster-wide unique ID of the packet, the current value of the running counter of the packet, and an attribute that indicates that the packet is to be traced to the receiving node.

9. The method of claim 8, wherein each of the additional nodes includes a record buffer stored on that node, the record buffer including at least the cluster-wide unique ID of the packet and one or more descriptions of operations performed on the packet within that node along with an associated value of the running counter for each operation.

10. The method of claim 9, further comprising generating a cluster-wide trace for the packet by querying each of the additional nodes of the plurality of nodes to provide contents associated with the cluster-wide unique ID of the packet from the record buffer that is stored on that node.

11. A non-transitory computer readable storage media encoded with instructions that, when executed by a processor, cause the processor to perform operations comprising:
   selecting a packet for tracing, the packet being configured to traverse through a cluster comprising a plurality of nodes;
   preparing the packet for tracing by: generating a cluster-wide unique identifier (ID) for the packet, associating the cluster-wide unique ID with the packet, generating a running counter for the packet, and associating the running counter with the packet, wherein the running counter has an initial value;
   generating a first record buffer that is stored on a first node of the plurality of nodes;
   recording at least the cluster-wide unique ID and the initial value of the running counter for the packet in the first record buffer stored on the first node;
   recording descriptions of a plurality of operations performed on the packet in the first record buffer along with a current value of the running counter, wherein the current value of the running counter is incremented by one after each one of the descriptions of the plurality of operations performed is recorded; and
   transferring the packet to a second node of the plurality of nodes, wherein the cluster-wide unique ID of the packet, the value of the running counter of the packet, and an attribute that indicates that the packet is to be traced is provided to the second node.

12. The non-transitory computer readable storage media of claim 11, wherein the cluster-wide unique ID for the packet is generated based on an originating node of the plurality of nodes that selects the packet for tracing.

13. The non-transitory computer readable storage media of claim 12, wherein the originating node is the first node.

14. The non-transitory computer readable storage media of claim 11, wherein the packet traverses at least the first node and the second node, and the operations further comprise generating a cluster-wide trace for the packet by:
querying the first node to provide contents associated with the cluster-wide unique ID of the packet from the first record buffer; and
querying the second node to provide contents associated with the cluster-wide unique ID of the packet from a second record buffer that is stored on the second node.

15. The non-transitory computer readable storage media of claim 14, wherein generating the cluster-wide trace for the packet further comprises sequencing operations performed on the packet using the current value of the running counter for each operation stored in the first record buffer and the second record buffer.

16. An apparatus comprising:
a network interface configured to enable network communications with a plurality of nodes in a cluster;
a memory; and
a processor coupled with the memory and the network interface, and configured to:
query the plurality of nodes for information associated with a packet, wherein the packet is identified by a cluster-wide unique identifier (ID) generated by an originating node of the plurality of nodes;
receive contents of record buffers from the plurality of nodes, wherein the contents of the record buffers includes at least the cluster-wide unique ID of the packet and one or more descriptions of operations performed on the packet, wherein each of the one or more descriptions of operations performed on the packet has an associated counter value from a running counter associated with the packet, wherein at least one of the record buffers includes descriptions of a plurality of operations performed on the packet;
combine the contents of the record buffers from the plurality of nodes; and
generate a cluster-wide packet trace for the packet using the contents of the record buffers from the plurality of nodes.

17. The apparatus of claim 16, wherein the packet traverses multiple nodes of the plurality of nodes of the cluster;
wherein the multiple nodes include at least one sending node and at least one receiving node, wherein the sending node transmits the packet to the receiving node; and
wherein the sending node further provides the cluster-wide unique ID of the packet, a current value of the running counter of the packet, and an attribute that indicates that the packet is to be traced to the receiving node.

18. The apparatus of claim 17, wherein each of the multiple nodes includes a record buffer stored on that corresponding node, the record buffer including at least the cluster-wide unique ID of the packet and at least one of the one or more descriptions of operations performed on the packet within that node along with an associated value of the running counter for each operation of the one or more descriptions of operations performed; and
wherein the processor is configured to receive the contents of the record buffer associated with the packet from each of the multiple nodes in response to the query.

19. The apparatus of claim 16, wherein the processor is further configured to communicate with a control operation interface associated with each node of the plurality of nodes, wherein the control operation interface is configured to respond to the query requesting contents associated with the cluster-wide unique ID of the packet from the record buffer that is stored on the node.

20. The apparatus of claim 16, wherein the processor is further configured to sequence operations performed on the packet using the associated counter value of the running counter for each operation stored in the contents of the record buffers from the plurality of nodes.

* * * * *